United States Patent Office 3,394,055
Patented July 23, 1968

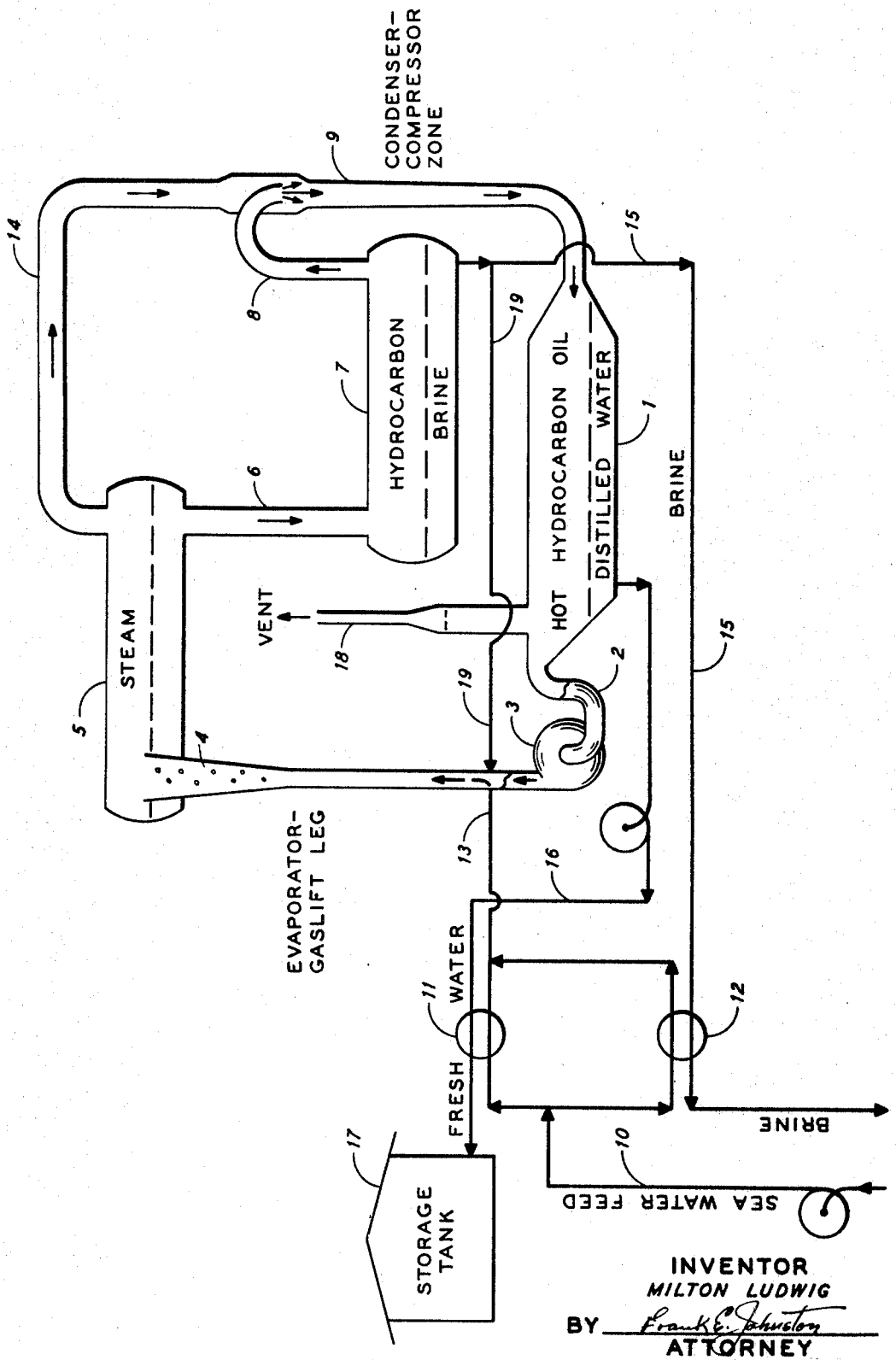

3,394,055
DESALTING OF SALINE WATERS
Milton Ludwig, Berkeley, Calif., assignor to Chevron Research Company, a corporation of Delaware
Filed Oct. 23, 1961, Ser. No. 146,894
5 Claims. (Cl. 203—10)

This invention relates to a process for the production of fresh water from saline waters such as sea water, brackish waters, brines from subterranean formations, and the like.

The problem of desalting saline waters economically is one of considerable importance, especially in heavily populated, relatively arid regions reasonably close to a body of saline water. Considerable attention has been given to this problem over a considerable period of time and progress has been made in lowering desalting costs.

The present invention provides a new desalting process which appears to permit production of fresh water from saline waters at costs below those of processes heretofore proposed.

Pursuant to this invention, a hot inert liquid, preferably a hydrocarbon oil, having a boiling point substantially above the boiling point of water, is mechanically driven around a closed circuit containing as its essential elements a saline water evaporator zone, a steam-liquid separation zone, an oil-brine separation zone, a hydraulic steam compressor-steam condenser zone, and an oil-water separation zone. Preheated saline water feed is introduced into the oil in the evaporator zone and the resultant mixture is passed into the steam-liquid separation zone. Steam is withdrawn from the steam-liquid separation zone and passed into the hydraulic compressor-condenser zone together with oil from the brine-oil separator. Brine and fresh water are withdrawn from the closed circuit at the oil-brine separation zone and the oil-water separation zone, respectively. The withdrawn materials are contacted with fresh saline water feed in indirect heat exchange zones to preheat the feed.

In a more specific embodiment of the invention, hot hydrocarbon oil is mechanically driven around a closed circuit comprised of an oil-water separation zone, an oil-brine separation zone, a steam-liquid separation zone at an elevation substantially above the separation zones previously specified, an elongated substantially vertical evaporator zone connecting the oil-water separation zone with the steam-liquid separation zone, a hydraulic condenser-compressor zone connecting the steam-liquid separation zone with the oil-water separation zone, a liquid transfer line connecting the steam-liquid separation zone with the oil-brine separation zone and an oil transfer line connecting the oil-brine separation zone with the condenser compressor zone, the path of oil travel through the closed circuit being from the oil-water separation zone to the evaporator gas-lift zone to the steam-liquid separation zone to the oil-brine separation zone to the condenser-compressor zone and back to the oil-water separation zone, withdrawing steam from the steam-liquid separation zone and passing it into the condenser-compressor zone, withdrawing brine from the oil-brine separation zone and discharging it from the circuit, withdrawing water from the oil-water separation zone and discharging it from the circuit, preheating saline water feed by heat exchange with the brine and water being discharged from the circuit, introducing the preheated saline water feed into the lower portion of the evaporator gas-lift zone, and controlling the volume of fresh saline water feed introduced into the evaporator gas-lift zone to maintain a volume ratio of oil to fresh saline water feed in said zone at a level above 20:1.

The process of the invention may be better understood by reference to the appended drawing which is a diagrammatic illustration of apparatus and process flow suitable for the practice of the invention.

Hydrocarbon oil is withdrawn from the oil phase in oil-water separator 1 through line 2 and driven by pump 3 through evaporator zone 4 into steam-liquid separator 5. The brine-oil liquid mixture is withdrawn from steam-liquid separator 5 through line 6 and passed into brine-oil separator 7. Oil is withdrawn from brine-oil separator 7 through line 8 and passed into the upper end of condenser-compressor zone 9. Zone 9 is a hydraulic condenser-compressor zone and the general principle of hydraulic gas compression is described in Marks' Mechanical Engineers' Handbook (pp. 1872, 1873 of the 4th edition). A mixture of oil and fresh liquid water is produced in condenser-compressor zone 9 and passed into oil-water separator 1. Saline water feed is passed through line 10 and then through line 13 into evaporator zone 4. Steam is withdrawn from steam-liquid separator zone 5 through line 14 and passed into condenser-compressor zone 9. Brine is withdrawn from oil-brine separator zone 7 through line 15 and passed through indirect heat exchanger 12 where it is in indirect heat exchange with part of the saline water feed and then is discharged as waste product. Fresh water product is removed from oil-water separator zone 1 through line 16 and passed through heat exchange zone 11 where it is in indirect heat exchange contact with part of the fresh saline water feed and then into storage tank 17. Fixed gases which may become entrained in the liquid circulating in the closed circuit are removed from the system through vent 18. A portion of the brine withdrawn from oil-brine separation zone 7 may be recycled through line 19 into the evaporator zone. The volume of the recycle stream through line 19 may vary from a relatively small volume to a volume 10 or more times the volume of the fresh saline water feed charged to the system. No brine recycle is necessary in the operation of the system, but the employment of a recycle stream may aid evaporation in the evaporator zone by providing more brine-oil contact surface. The optimum volume of brine recycle will vary, depending upon the efficiency of heat transfer in the evaporator zone.

All of the major vessels and connecting lines in the system should be well insulated to prevent energy loss by radiation.

In the embodiment of the invention illustrated in the drawing, the evaporator zone is a long, substantially vertical transfer line from pump 3 to steam-liquid separator zone 5. The length of the evaporator zone might, in the typical commercial scale installation, be of the order of 100 feet in length.

Condenser-compressor zone 9 in a commercial installation would typically be of the order of 50 to 150 feet in length. Length of this order would provide a sufficient liquid-pressure head to cause compression and condensation of the steam.

That the condenser-compressor zone be an elongated vertical zone is necessary, but the other components of the closed circuit could be all at approximately the same elevation. If each of hydrocarbon-brine separator zone 7, oil-water separator zone 1, and steam-liquid separator zone 5 were at approximately the same level, then pump 3 might be moved from the situation shown in the drawing and inserted in line 8 to pump oil from oil-brine separator zone 7 to an elevation 60 feet or so above the level of the separator vessels, at which elevation the top of the condenser-compressor zone would be located.

The following conditions are illustrative of the operation of the process of the invention where a plant is operated to produce approximately 1000 gallons per day of fresh water. Hot heavy naphtha is pumped around the circuit of an evaporation zone, a steam-liquid separation zone, an oil-brine separation zone, a condenser-compressor zone, and oil-water separation zone at the rate of 56,000 pounds per hour by a pump having a brake horsepower of 3.1. The oil temperature in the oil-water separation zone is approximately 210° F. In the steam-liquid separation zone and in the oil-brine separation zone, the temperature is approximately 200° F. Steam is withdrawn from the steam-liquid separation zone at approximately 200° F. and condensed in the compressor-condenser zone where the release of latent heat of vaporization heats the oil acting as the hydraulic condensing medium to approximately 210° F. The sea-water feed is introduced into the evaporator zone at a rate of 718 pounds per hour. The sea water is initially at 60° F. and is preheated by indirect heat exchange with hot brine effluent and fresh water product to approximately 194° F. The effluent brine and the fresh water product are cooled to approximately 71° F. during their indirect heat exchange contact with the sea-water feed. If the closed circuit is very efficiently insulated, then the only energy lost from the system is lost as the result of discharging spent brine and fresh water product from the system at a temperature of approximately 11° F. above the temperature at which the fresh saline water feed is introduced into the system. This net energy loss is made up entirely by the energy put into the circulating liquid by the mechanical action of the pump. No source of heat or energy for introduction into the closed circuit other than the energy provided by the pump is required. At startup, the circulating body of oil may be preheated by an auxiliary heater or, if desired, it may be preheated simply by circulating it around the closed circuit until its temperature rises to operating temperature.

Instead of circulating a hydrocarbon oil around the closed circuit, any liquid which is essentially insoluble in water, has a low viscosity, and has a boiling point substantially above the boiling point of water, may be employed. In general, a petroleum fraction having an initial boiling point above about 250° F. and a viscosity below about 5 centipoises at operating temperature is satisfactory for use in the process of the invention.

In the practice of the invention the ratio of hydrocarbon to fresh saline water feed introduced into the evaporator zone should be above 10:1, and will commonly be above 20:1. This ratio will generally lie in the range of 20:1 to 200:1.

In the practice of the invention, the hydrocarbon oil serves the dual purpose of acting as a direct heat exchange medium to vaporize water from saline water feed, and to act as a driving liquid in a mixed phase hydraulic condenser-compressor zone. Consequently, the water is vaporized and condensed in a system characterized by small temperature differences and without recourse to the employment of metallic heat exchange surfaces. Also, the compression is accomplished at nearly constant temperature so that condensation occurs simultaneously. Thus, the theoretical horsepower for compression of the steam is substantially less than that required for isentropic compression.

A process above described and claimed hereinafter provides an economic method for recovering fresh water.

Having described my invention, I claim:

1. Process for the production of fresh water from salt water, which comprises mechanically driving a hot, water-insoluble, inert normally liquid material having a boiling point substantially above that of water through a closed circuit containing a liquid-liquid separator in the lower portion of the circuit, a second liquid-liquid separator at an intermediate portion of the circuit and a gas-liquid separator to the gas-liquid separator, withdrawing salt water feed preheated as hereinafter described into the inert liquid stream en route from the lower liquid-liquid separator tot he gas-liquid separator, withdrawing salt water and inert liquid from the lower portion of the gas-liquid separator and passing it into the intermediate liquid-liquid separator, withdrawing salt water from the intermediate liquid-liquid separator and discharging it from the circuit through an indirect heat exchange zone where it is placed in indirect heat exchange contact with a portion of the salt water feed, withdrawing inert liquid from the intermediate liquid-liquid separator and passing it through an elongated vertical condenser-compressor zone into the lower liquid-liquid separator, withdrawing water vapor from the upper portion of the gas-liquid separator and passing it into the downwardly flowing inert liquid in the compressor-condenser zone whereby it is hydraulically compressed to liquid water, withdrawing inert liquid from the lower liquid-liquid separator and mechanically driving it to the gas-liquid separator, withdrawing fresh water product from the lower liquid-liquid separator and discharging it from the circuit through a heat exchange zone where it is placed in indirect heat exchange contact with a part of the salt water feed and supplying at least the major proportion of heat required to maintain the criculating inert liquid at elevated temperature by conversion to heat of the mechanical energy required to drive the inert liquid around the closed circuit.

2. Process for the production of fresh water from saline water, which comprises mechanically driving hot normally liquid hydrocarbon oil having a boiling point substantially above the boiling point of water around a closed circuit comprised of a water-liquid oil separation zone, a brine-liquid oil separation zone, a steam-liquid separation zone at an elevation substantially above the separation zones previously specified, an elongated substantially vertical evaporator-gas lift zone connecting the water-liquid oil separation zone with the steam-liquid separation zone, a condenser-compressor zone connecting the steam-liquid separation zone with the water-liquid oil separation zone, a liquid transfer line connecting the steam-liquid separation zone with the brine-liquid oil separation zone and an oil trnasfer line connecting the brine-liquid oil separation zone with the condenser compressor zone, the path of liquid oil travel through the closed circuit being from the water-liquid oil separation zone to the evaporator-gas lift zone to the steam-liquid separation zone to the brine-liquid oil separation zone to the condenser-compressor zone and back to the water-liquid oil separation zone, withdrawing steam from the steam-liquid separation zone and passing it into the downwardly flowing oil in the compressor-condenser zone whereby it is hydraulically compressed to liquid water, withdrawing brine from the brine-liquid oil separation zone and discharging it from the circuit, withdrawing water from the water-liquid oil separation zone and discharging it from the circuit, preheating saline water feed by heat exchange with the brine and water being discharged from the circuit, introducing the preheated saline water feed into the lower portion of the evaporator gas-lift zone, controlling the volume of fresh saline water feed introduced into the evaporator gas lift zone to maintain a volume ratio of liquid oil to fresh saline water feed in said zone at a level above 20:1 and supplying at least the major proportion of heat required to maintain the circulating oil at elevated temperature by conversion to heat of the mechanical energy required to drive the oil into the evaporation zone.

3. Process for the production of fresh water from saline water, which comprises:
   passing a saline water feed and a hot normally liquid hydrocarbon oil upward through an elongated evaporation zone,
   withdrawing steam and liquid from the upper portion of the evaporation zone and passing them into a steam-liquid separation zone,
   withdrawing liquid from the steam-liquid separation zone and passing it into a saline water-liquid oil separation zone, withdrawing steam from the steam-liquid separation zone and oil from the saline water-liquid oil separation zone and passing them together downwardly through an elongated passage constituting a hydraulic compressor-condenser zone whereby the steam is hydraulically compressed to form liquid water, withdrawing water and liquid oil from the lower portion of the condenser-compressor zone and passing them into a water-liquid oil separation zone;

withdrawing saline water from the saline water-liquid oil separation zone and discharging it through a heat exchange zone in which it is in indirect heat exchange with fresh saline water feed, withdrawing water from the water-liquid oil separation zone as product, withdrawing oil from the water-liquid oil separation zone and mechanically driving it into the evaporation zone, maintaining a volume ratio of oil to saline water in the evaporation zone above 10:1, and supplying at least the major proportion of heat required to maintain the circulating oil at elevated temperature by conversion to heat of the mechanical energy required to drive the oil into the evaporation zone.

4. Process for the production of fresh water from saline water which comprises:

passing a saline water feed and a hot normally liquid hydrocarbon oil upward through an evaporation zone to generate steam and concentrate the saline water, withdrawing the concentrated saline water and liquid hydrocarbon oil from the evaporation zone and passing the concentrated saline water and liquid hydrocarbon oil into a concentrated saline water-liquid hydrocarbon oil separation zone, withdrawing said steam from the evaporation zone, and withdrawing liquid hydrocarbon oil from the concentrated saline water-liquid hydrocarbon oil separation zone and passing said steam and said liquid hydrocarbon oil together downwardly through an elongated passage constituting a hydraulic compressor-condenser zone whereby the steam is hydraulically compressed to form said fresh water, withdrawing said fresh water and liquid hydrocarbon oil from the lower portion of the condenser-compressor zone and passing said fresh water and said liquid hydrocarbon oil into a water-liquid hydrocarbon oil separation zone, withdrawing concentrated saline water from the concentrated saline water-liquid hydrocarbon oil separation zone and discharging it through a heat exchange zone in which it is in indirect heat exchange with fresh saline water feed, withdrawing water from the water-liquid hydrocarbon oil separation zone as product, withdrawing liquid hydrocarbon oil from the water-liquid hydrocarbon oil separation zone and conveying it to the evaporation zone to be passed therethrough with said saline water feed.

5. In an apparatus for obtaining purified water from a brine solution, the combination comprising:

a supply of heated oil, pump means for elevating oil to an evaporating means at an elevated level, means for introducing the brine solution downstream of the pump means, said evaporating means forming water vapor and a concentrated brine in the presence of the heated oil and establishing a liquid level therein of mixed oil and concentrated brine, connected to said evaporating means, a first separating means for receiving the mixture and for separating said oil from said concentrated brine, a second separating means located below the first separating means for effecting a decant of hydrocarbon oil and condensed purified water, a first conduit for removing water vapor from the evaporating means and connected to the second separator, a second conduit removing hydrocarbon oil decanted in the first separator opening into and introducing the oil at a point intermediate the first conduit and directing the oil downwardly in the first conduit, the opening of the first conduit being disposed at a level to discharge the oil into the first conduit under the hydrostatic head of the liquid level in the evaporating means, the downward direction of oil entrapping vapor removed from the evaporating means and compressing and condensing the water vapor as purified water condensate introduced into the second separator, means for transferring said oil from said second separating means to said pump, and, means for withdrawing purified water condensate from said second separating means.

References Cited

UNITED STATES PATENTS

| | | | |
|---|---|---|---|
| 585,365 | 6/1897 | Skiffington | 202—185.2 |
| 677,845 | 7/1901 | Coleman | 202—185.2 |
| 1,547,893 | 7/1925 | Bergius | 202—234 |
| 1,874,621 | 8/1932 | Randel | 62—483 X |
| 1,882,254 | 10/1932 | Randel | 62—483 X |
| 2,764,488 | 9/1956 | Slattery | 62—123 |
| 2,821,304 | 1/1958 | Zarchin | 62—123 |
| 2,976,224 | 3/1961 | Gilliland. | |

FOREIGN PATENTS

| | | |
|---|---|---|
| 176,499 | 3/1922 | Great Britain. |
| 479,954 | 3/1925 | Germany. |

NORMAN YUDKOFF, *Primary Examiner.*

F. E. DRUMMOND, *Assistant Examiner.*

UNITED STATES PATENT OFFICE
CERTIFICATE OF CORRECTION

Patent No. 3,394,055                                              July 23, 1968

Milton Ludwig

It is certified that error appears in the above identified patent and that said Letters Patent are hereby corrected as shown below:

Column 3, line 71, "separator to the gas-liquid separator withdrawing salt" should read -- separator in the upper portion of the circuit, forcing salt --. Column 4, line 38, "trnasfer" should read -- transfer --.

Signed and sealed this 27th day of January 1970.

(SEAL)
Attest:

Edward M. Fletcher, Jr.
Attesting Officer

WILLIAM E. SCHUYLER, JR.
                                                         Commissioner of Patents